US011922757B2

(12) United States Patent
Shigeta

(10) Patent No.: US 11,922,757 B2
(45) **Date of Patent: *Mar. 5, 2024**

(54) CARD GAME MONITORING SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 47 days.

This patent is subject to a terminal disclaimer.

(21) Appl. No.: 17/481,551

(22) Filed: Sep. 22, 2021

(65) Prior Publication Data

US 2022/0005308 A1 Jan. 6, 2022

Related U.S. Application Data

(63) Continuation of application No. 16/150,378, filed on Oct. 3, 2018, now Pat. No. 11,158,159, which is a (Continued)

(30) Foreign Application Priority Data

Jan. 17, 2014 (AU) ................................ 2014200314

(51) Int. Cl.
*G07F 17/32* (2006.01)

(52) U.S. Cl.
CPC ........ *G07F 17/3206* (2013.01); *G07F 17/322* (2013.01); *G07F 17/3237* (2013.01); (Continued)

(58) Field of Classification Search
CPC ............. G07F 17/3202; G07F 17/3204; G07F 17/3206; G07F 17/322; G07F 17/3241; (Continued)

(56) References Cited

U.S. PATENT DOCUMENTS 4,531,187 A 7/1985 Uhland
5,781,647 A 7/1998 Fishbine et al.
(Continued)

FOREIGN PATENT DOCUMENTS

AU 2012201094 A1 3/2012
CA 2543251 A1 10/2000
(Continued)

OTHER PUBLICATIONS

International Application No. PCT/JP2015/000171, International Search Report and Written Opinion dated Mar. 27, 2015.
(Continued)

*Primary Examiner* — Omkar A Deodhar
(74) *Attorney, Agent, or Firm* — NORTON ROSE FULBRIGHT US LLP

(57) ABSTRACT

The present disclosure is related to a table game monitoring system to enable stoppage of an ongoing game when something unexpected happens by administrating the whole game from the start to the end of the game and during payoffs. A card game monitoring system includes a game table with betting areas for betters to put wagers, a card shooter apparatus configured to read and record the number (rank) and suit of cards. A control unit is configured to determine a winning hand according to table game rules based on information of the cards read by the card shooter apparatus. A video camera system is configured to capture positions of cards and identify wagers on each betting area at the game table. The control unit is further configured to check whether wagers with payoff move to a pool of the winner of the bettors determined by the card shooter apparatus.

21 Claims, 2 Drawing Sheets

Related U.S. Application Data continuation-in-part of application No. 15/112,038, filed as application No. PCT/JP2015/000171 on Jan. 16, 2015, now Pat. No. 11,145,158.

(52) U.S. Cl.
CPC ...... *G07F 17/3241* (2013.01); *G07F 17/3248* (2013.01); *G07F 17/3276* (2013.01); *G07F 17/3293* (2013.01)

(58) Field of Classification Search
CPC ............. G07F 17/3248; G07F 17/3272; G07F 17/3293; A63F 2001/003; A63F 1/067; A63F 1/14; A63F 1/16; A63F 2003/00164
See application file for complete search history.

(56) References Cited

U.S. PATENT DOCUMENTS

| | | | |
|---|---|---|---|
| 5,831,527 | A | 11/1998 | Jones, II |
| 6,093,103 | A | 7/2000 | McCrea |
| 6,117,012 | A | 9/2000 | McCrea |
| 6,460,848 | B1 | 10/2002 | Soltys et al. |
| 6,514,140 | B1 | 2/2003 | Storch |
| 6,582,301 | B2 | 6/2003 | Hill |
| 6,848,994 | B1 | 2/2005 | Knust et al. |
| 6,908,385 | B2 | 6/2005 | Green |
| 7,213,812 | B2 | 5/2007 | Schubert et al. |
| 7,661,676 | B2 | 2/2010 | Smith et al. |
| 8,337,296 | B2 | 12/2012 | Grauzer et al. |
| 8,490,973 | B2 | 7/2013 | Yoseloff et al. |
| 9,189,918 | B1 | 11/2015 | Gronkowski et al. |
| 11,580,746 | B2 | 2/2023 | Vo et al. |
| 2002/0042298 | A1 | 4/2002 | Soltys et al. |
| 2002/0045476 | A1 | 4/2002 | Poole et al. |
| 2002/0045479 | A1 | 4/2002 | Soltys et al. |
| 2002/0089120 | A1 | 7/2002 | Miller |
| 2002/0123376 | A1 | 9/2002 | Walker et al. |
| 2002/0155869 | A1 | 10/2002 | Soltys et al. |
| 2003/0064798 | A1 | 4/2003 | Grauzer et al. |
| 2003/0087696 | A1 | 5/2003 | Soltys et al. |
| 2003/0195025 | A1 | 10/2003 | Hill |
| 2003/0232651 | A1 | 12/2003 | Huard et al. |
| 2005/0012270 | A1 | 1/2005 | Schubert |
| 2005/0026680 | A1 | 2/2005 | Gururajan |
| 2005/0051965 | A1 | 3/2005 | Gururajan |
| 2005/0062226 | A1 | 3/2005 | Schbert et al. |
| 2005/0137005 | A1 | 6/2005 | Soltys et al. |
| 2005/0148391 | A1 | 7/2005 | Tain |
| 2005/0258597 | A1 | 11/2005 | Soltys |
| 2005/0272501 | A1 | 12/2005 | Tran et al. |
| 2005/0288086 | A1 | 12/2005 | Schubert et al. |
| 2006/0027970 | A1 | 2/2006 | Kyrychenko |
| 2006/0063577 | A1 | 3/2006 | Downs, III et al. |
| 2006/0160608 | A1 | 7/2006 | Hill et al. |
| 2006/0177109 | A1 | 8/2006 | Storch |
| 2006/0183540 | A1 | 8/2006 | Grauzer et al. |
| 2006/0199649 | A1 | 9/2006 | Soltys et al. |
| 2006/0202422 | A1 | 9/2006 | Bahar |
| 2006/0217199 | A1 | 9/2006 | Adcox et al. |
| 2006/0252521 | A1 | 11/2006 | Gururajan et al. |
| 2007/0015583 | A1 | 1/2007 | Tran |
| 2007/0049369 | A1 | 3/2007 | Kuhn et al. |
| 2007/0111773 | A1 | 5/2007 | Gururajan et al. |
| 2007/0117604 | A1 | 5/2007 | Hill |
| 2007/0178955 | A1 | 8/2007 | Mills |
| 2008/0113783 | A1 | 5/2008 | Czyzewski et al. |
| 2008/0143048 | A1 | 6/2008 | Shigeta |
| 2008/0180250 | A1 | 7/2008 | Steil |
| 2008/0303210 | A1 | 12/2008 | Grauzer et al. |
| 2009/0075725 | A1 | 3/2009 | Koyama |
| 2009/0104961 | A1 | 4/2009 | Hamada et al. |
| 2009/0121434 | A1 | 5/2009 | Baerlocher et al. |
| 2009/0131151 | A1 | 5/2009 | Harris et al. |
| 2009/0140492 | A1 | 6/2009 | Yoseloff et al. |
| 2009/0143141 | A1 | 6/2009 | Wells et al. |
| 2009/0176546 | A1 | 7/2009 | Kyrychenko |
| 2009/0191933 | A1 | 7/2009 | French |
| 2009/0233699 | A1 | 9/2009 | Koyama |
| 2009/0273141 | A1 | 11/2009 | Bahar |
| 2010/0016050 | A1 | 1/2010 | Snow et al. |
| 2010/0109244 | A1 | 5/2010 | Low |
| 2010/0207324 | A1 | 8/2010 | Soltys et al. |
| 2010/0244382 | A1 | 9/2010 | Snow |
| 2011/0052049 | A1 | 3/2011 | Rajaraman et al. |
| 2011/0079959 | A1 | 4/2011 | Hartley |
| 2011/0127722 | A1 | 6/2011 | Emori et al. |
| 2011/0130184 | A1 | 6/2011 | Mills |
| 2011/0227703 | A1 | 9/2011 | Kotab |
| 2012/0080845 | A1 | 4/2012 | Emori et al. |
| 2012/0231866 | A1 | 9/2012 | Witty et al. |
| 2012/0252564 | A1 | 10/2012 | Moore et al. |
| 2013/0109455 | A1 | 5/2013 | Grauzer et al. |
| 2013/0307215 | A1 | 11/2013 | Shigeta |
| 2014/0094239 | A1 | 4/2014 | Grauzer et al. |
| 2014/0274252 | A1 | 9/2014 | Chun |
| 2015/0087417 | A1 | 3/2015 | George et al. |
| 2015/0375096 | A1 | 12/2015 | Jackson et al. |
| 2018/0247134 | A1 | 8/2018 | Bulzacki et al. |
| 2020/0034629 | A1 | 1/2020 | Vo et al. |
| 2020/0302168 | A1 | 9/2020 | Vo et al. |
| 2021/0232828 | A1 | 7/2021 | Vo et al. |
| 2023/0154279 | A1 | 5/2023 | Shigeta |

FOREIGN PATENT DOCUMENTS

| | | | |
|---|---|---|---|
| CN | 101687112 | A | 3/2010 |
| CN | 102125756 | A1 | 7/2011 |
| CN | 102892472 | A | 1/2013 |
| CN | 103418128 | A | 12/2013 |
| EP | 2545967 | A2 | 1/2013 |
| EP | 2613298 | A1 | 7/2013 |
| JP | 2012075781 | A | 4/2012 |
| MO | I001207 | A | 11/2013 |
| TW | 201200214 | A | 1/2012 |
| WO | 98/33566 | A1 | 8/1998 |
| WO | 01/91866 | A1 | 12/2001 |
| WO | 2005/025701 | A2 | 3/2005 |

OTHER PUBLICATIONS

Written Opinion of the Intellectual Property Office of Singapore dated Jul. 10, 2017 issued in Singapore Application No. 11201605347T.
Search Report of the Intellectual Property Office of Singapore dated Jul. 7, 2017 completed in Singapore Application No. 11201605347T.
Office Action dated Dec. 1, 2017 for EP Application 15701853.2.
Office Action dated Jun. 29, 2017 for New Zealand Application 721845.
Office Action dated Sep. 8, 2017 for U.S. Appl. No. 15/112,038.
Office Action dated Jul. 13, 2018 for parent application, U.S. Appl. No. 15/112,038.
Office Action dated Jul. 26, 2018 for U.S. Appl. No. 15/894,090.
European Search report dated Sep. 25, 2018 for EP Application 18187764.8.
U.S. Office Action dated Nov. 20, 2018 for U.S. Appl. No. 15/998,000.
U.S. Office Action dated Jan. 10, 2019 for U.S. Appl. No. 15/112,038.
U.S. Office Action dated Jan. 10, 2019 for U.S. Appl. No. 15/894,090.
Singaporean Office Action dated May 13, 2019 for SG Application No. 10201801579R.
Examination Report for AU Application No. 2018203865 dated Aug. 14, 2019.
Final Action for U.S. Appl. No. 16/000,056 dated Aug. 20, 2019.
Search Report & Written Opinion for SG Application No. 10201804982S dated Aug. 21, 2019.
Final Action for U.S. Appl. No. 15/998,000 dated Sep. 9, 2019.
Chinese Office Action dated Jan. 3, 2020 issued in CN Application No. 201810096721.5.
U.S. Office Action dated Apr. 17, 2020 issued in U.S. Appl. No. 15/998,000.
U.S. Office Action dated Jun. 26, 2020 issued in U.S. Appl. No. 15/894,090.

(56) References Cited

OTHER PUBLICATIONS

U.S. Final Office Action dated Nov. 10, 2020 issued in U.S. Appl. No. 16/150,378.
U.S. Notice of Allowance dated Jan. 13, 2021 issued in U.S. Appl. No. 16/000,056.
Office Action for U.S. Appl. No. 15/894,090 dated Sep. 20, 2019.
Office Action for U.S. Appl. No. 15/112,038 dated Sep. 20, 2019.
U.S. Office Action dated Jun. 10, 2021 issued in U.S. Appl. No. 15/998,000.
Chinese Office Action dated Jun. 9, 2021 issued in CN Application No. 202010076775.2.
Chinese Office Action dated Jun. 9, 2021 issued in CN Application No. 202010076776.7.
Chinese Office Action dated Jun. 23, 2021 issued in CN Application No. 202010076770.X.
Chinese Office Action dated Mar. 21, 2022 issued in CN Application No. 201810096721.5.
JP Decision of Dismissal of Amendment dated Apr. 12, 2022 issued in JP Application No. 2020-178113.
U.S. Notice of Allowance dated Mar. 22, 2022 issued in U.S. Appl. No. 15/998,000.
Filipino Office Action dated Jul. 4, 2022 issued in PH Application No. 1-2021-553100.
U.S. Office Action dated Mar. 14, 2023 issued in U.S. Appl. No. 17/521,078.
U.S. Office Action dated Oct. 4, 2023 issued in U.S. Appl. No. 18/102,357.

CARD GAME MONITORING SYSTEM

CROSS REFERENCE TO RELATED APPLICATIONS

The present application is a continuation of U.S. patent application Ser. No. 16/150,378 filed Oct. 3, 2018, which is a continuation-in-part from U.S. patent application Ser. No. 15/112,038 filed Jul. 15, 2016, which is a 371 application of PCT/JP2015/000171 filed Jan. 16, 2015, which claims priority to AU Pat. App. No. 2014200314 filed Jan. 17, 2014.

DESCRIPTION

Technical Field

The present invention relates to a table game monitoring system for a table game using playing cards from a shoe having multiple decks that have been shuffled together prior to the beginning of play in which bettors make wagers on betting areas of a game table in front of the bettors. This table game monitoring system monitors whether or not wagers of winning bettor(s) move to appropriate area of the winner(s).

Background Art

Baccarat and Black Jack are of the many live table games played in casinos or gaming establishments. These games use a standard deck of 52 playing cards and are usually dealt from a shoe having multiple decks (6 to 9 or 10 decks) that have been shuffled together prior to the beginning of play. When operating people (hereinafter "the dealer") in casinos deliver playing cards to a game table for plays in such games, any loss of cards or exchange of cards between bettors, etc. should not occur, and also wagers with payoffs must correctly go to the winners of the bettors after each game has ended.

To assure fair games by preventing such loss or exchanges during games, the game tables in casinos should be administrated so that games at tables are played properly (i.e. there is no exchange of cards or any other accidental or fraudulent acts etc.) and wagers are correctly paid off to the winners. A system to monitor the game tables by camera is known and is disclosed in Patent Literature 1: (U.S. Pat. No. 6,582,301). This known system only monitors the table game and records whole games for later analysis if it is believed that some inappropriate act has occurred.

CITATION LIST

[PTL 1] U.S. Pat. No. 6,582,301B

SUMMARY OF INVENTION

The present invention provides a real-time monitoring of the table game and enables the casino to stop an ongoing game immediately when something unexpected happens by administrating the whole game from the start to the end of the game.

The present invention has been made in view of the above problem, and aims to provide a table game monitoring system with which it is possible to allow a casino to stop an ongoing game immediately when something unexpected happens by administrating the whole game from the start to the end of the game and during payoffs.

To solve the above conventional problems, the present invention provides the card game monitoring system having: a game table on which bettors make wagers on betting areas, a card shooter apparatus that is put on the game table and has a card reading unit that reads the number (rank) of the card and having a control unit to determine a winning hand according to a table game rules based on information of numbers of the cards sequentially read by the card reading unit and a monitor video camera system to capture positions of the card delivered from the card shooter apparatus to bettors and identify wagers on each betting area at the game table, the control unit has a processing function using the information of the monitor video camera system to determine: 1) head-count of the bettors playing each game by identifying the wagers on each betting area or cards delivered to bettors, 2) whether or not each bettor gets more than two cards from the card shooter apparatus, 3) each hand of the bettors and the dealer according to the information read by the card shooter apparatus using the information of head-count of the bettors according to the game rule, and 4) the winner(s) having the winning hand(s) in the game according to the game rule based on the information of the each hand of the bettors and the dealer, wherein the monitor video camera system further reads movements of wagers on the game table, and the control unit having further processing function to check whether wagers with payoffs move to the winner of the bettor determined by the card shooter apparatus at the end of each game.

In the card game monitoring system, the control unit has further processing function to identify ranks of playing cards on the game table delivered by a dealer and to check and report whether ranks of cards are the same as the ones determined by the card shooter apparatus.

DESCRIPTION OF EMBODIMENTS

Figure 1:
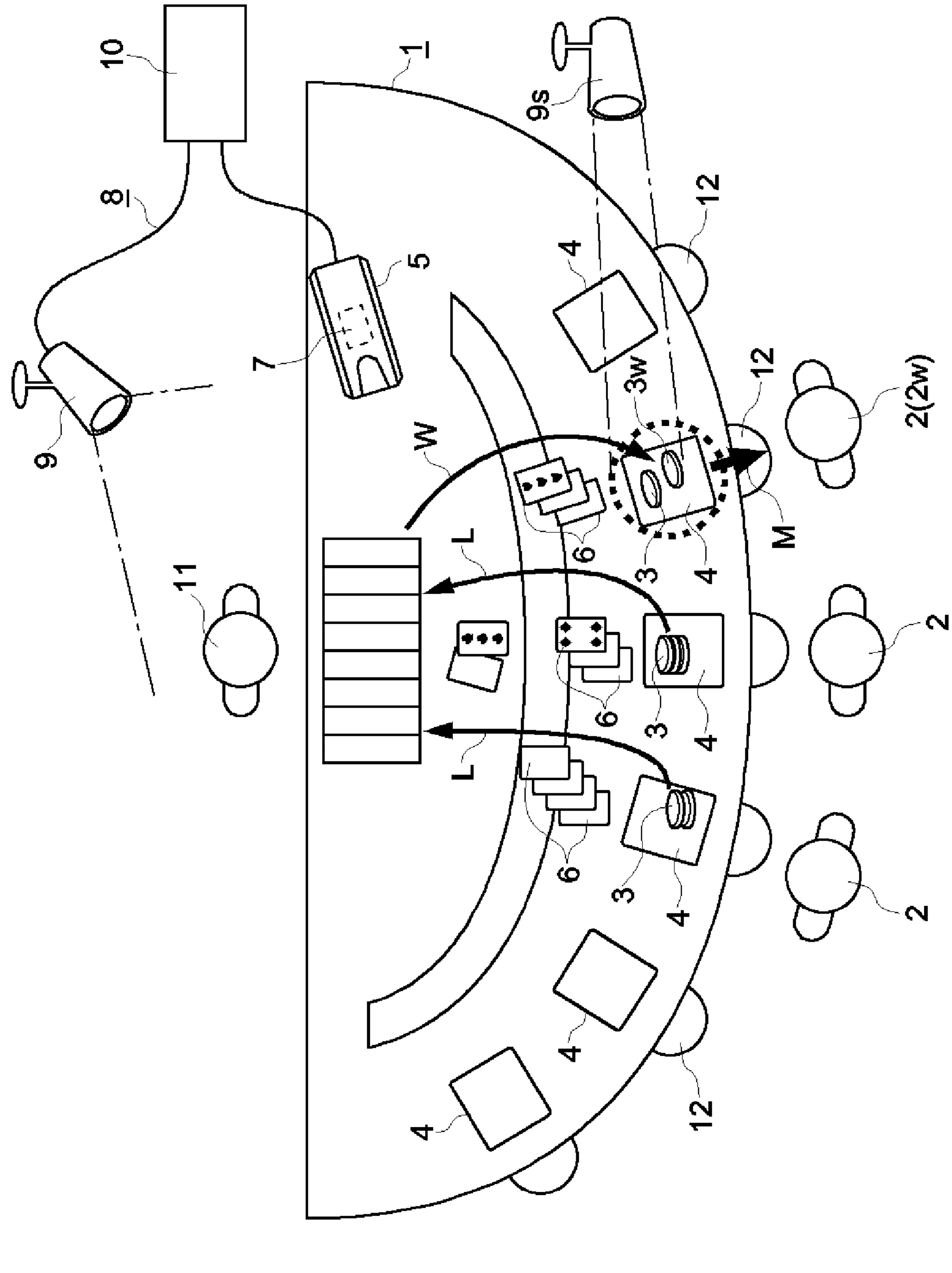
FIG. 1 is a diagram schematically showing the entirety of a table game system according to an embodiment 1 of the present invention.

Before entering a detailed description of the embodiments, a description will be made for the flow of a Black Jack game performed in a game parlor such as a casino.

At a game table 1, customers (players) 2 are seated in chairs so as to face a dealer 11. Each player 2 makes a wager (hereinafter, this will be a "bet") that the player 2 himself or herself will win against the dealer 11, as a win-loss result of a Black Jack game, by arranging substitute currency for gaming 3 on betting areas on the game table. Note that, while the details will be described later, in the present embodiment, it can be understood that cards 6 are distributed to the players 2 and the dealer 11, by comparing two images imaged by a camera unit 9, and the contents of the hands of each player 2 and the dealer 11 and a win-loss result can be determined, by understanding information of a rank of the cards 6 by a card shooter apparatus 5.

When making a bet, a side bet can be made, in addition to a normal bet. A side bet is a wager for whether or not a special situation will occur, such as a wager that the rank of the two cards initially distributed to each player 2 is identical (a "pair"), or a wager that the total value of the rank of the two cards is larger than 13, or is less than 13, and a redemption rate is usually set higher than that of a normal bet. Moreover, one player 2 can make multiple bets (having multiple hands) by putting chips at multiple locations.

The dealer 11 measures a timing to end bets by the players 2, calls "no more bets", and moves his or her hands in a horizontal direction or the like. Afterwards, the dealer 11 delivers the cards 6 face-up one at a time in front of each wager of each of the players 2 from the card shooter apparatus 5, and delivers one card face-up to the dealer 11 himself or herself. To continue, the cards 6 are again delivered face-up one at a time in front of each wager. At this time, a second card 6 has not yet been delivered to the dealer 11.

Here, the dealer 11 performs a determination of the above mentioned side bets, for each hand of two cards of each of the players 2, and performs a collection of wagers of losing players 2L who lost in the side bets and a payment to winning players 2W who won in the side bets. For example, in the case where a redemption rate of a "pair" is set to three times, and the rank of the two cards 6 delivered to a player 2 who bet a 100 dollar chip on a "pair" is identical, the dealer 11 takes out 300 dollars of chips from a chip tray, and pays these chips to the player 2.

Moreover, the dealer 11 performs a determination of "Black Jack (the total of the two cards is 21)" for each hand of each of the players 2, and in the case where there are hands that are Black Jack, performs a payment based on a prescribed redemption rate with respect to these hands. After payments are finished, the dealer 11 collects the cards 6 of the hands that are Black Jack, and puts the collected cards 6 in a prescribed area on the table 1.

Next, in the case where the first card delivered to the dealer 11 is an ace (A), each of the players 2 can select whether or not to make a wager for "insurance". In the case where making a wager for insurance, and the next card drawn by the dealer 11 is a 10 or a face card (the case where the hand of the dealer 11 is Back Jack), the wagers of the players 2 who performed insurance will be returned to the players 2.

In addition, in the case where the rank of the two cards 6 initially delivered as a hand is identical, a player 2 can perform a "split". In the case where performing a split, the player 2 puts substitute currency for gaming 3 of a same amount as the initially wagered amount next to the initially wagered amount, and declares that a split is performed. In the case where declaring that is split is performed, the dealer 11 separates the two cards distributed as the hand a prescribed distance or more so as not to overlap each other, and multiple hands will be composed with respect to one player 2. The player 2 can perform a side bet with respect to each of the split hands.

Afterwards, each of the players 2 selects "hit (draw one more card again)", "stay (do not draw a card)", or "surrender (drop out of the game)", in the order from the hand of the player 2 on the left side when seen from the dealer 11, for each hand. When a player 2 selects hit, the dealer 11 draws a card 6 from the card shooter apparatus 5, and puts this card overlapping in an orientation the same as the two cards 6 delivered at the start such as in FIG. 1. As a result of selecting hit, in the case where the total number of the rank of the hand exceeds 21, it will be "bust", and a loss for the player 2. When it is "bust", the dealer 11 collects the wager 3 and the cards 6 at this time. In the case where selecting hit and it is not "bust", the player 2 can continue to select hit again, stay, or place a side bet.

Moreover, a player 2 can select "double down (one more card is drawn, and cards other than this are not drawn)". In this case, the player 2 puts substitute currency for gaming 3 of a same amount as the initially wagered amount next to the initially wagered amount, and declares that a double down is performed. When declaring that a double down is performed, the dealer 11 draws one card 6 from the card shooter apparatus 5, and puts the card in an orientation (normally a 90° horizontal orientation) different to that of the card 6 delivered at the start.

In the case where the player 2 selects "surrender", the dealer 11 collects the wager 3, and pays half of the wagered amount to the player 2.

After card distribution is performed with respect to all of the hands, the dealer 11 draws a card 6 face-up from the card shooter apparatus 5 for the hand of the dealer 11 himself or herself, in accordance with the detailed rules of Black Jack. The dealer 11 normally continues to draw cards 6 until the total amount of the hand of the dealer 11 exceeds 16.

Note that, in the case where a bet has been made for insurance, and as a result of the dealer 11 drawing a second card, the hand of the dealer 11 is not Black Jack, the dealer 11 collects, at this time, the wager 3 that was bet for insurance.

After card distribution to the hand of the dealer 11 is finished, a win-loss is determined in accordance with the rules of Black Jack, for the hands of each of the players 2 and the dealer 11. The dealer 11 performs a payment to the winning players 2W, upon collecting the wagers 3 of the losing players 2L. In the case of a draw, the wagers 3 are returned to the players 2. Note that, in the case where the dealer 11 is bust, the dealer 11 performs a payment with respect to all of the hands remaining in place.

When a settlement is finished with respect to all hands, the dealer 11 collects the cards 6, and puts the cards in a prescribed area on the table 1. The dealer 11 returns the used cards 6 to the card shooter apparatus 5, in accordance with the casino.

Moreover, there will be cases where part of the above operations are different, in accordance with the casino. For example, while a case is described above where the card delivered to the dealer 11 at the start is one card, two cards may be delivered to the dealer 11 at the start, similar to the players 2, and one of these cards may be face-down. In addition to this case, only the dealer 11 may confirm the face-down card of the dealer 11, and the dealer 11 may confirm in advance whether or not the hand of the dealer 11 is Black Jack.

Hereinafter, an outline of a management system of a table game for Black Jack in an embodiment of the present invention will be described. A management system of a table game for Black Jack includes a table 1 on which game participants 2 make wagers by putting substitute currency for gaming 3 on betting areas 4, a card shooter apparatus 5 that is put on the table and has a card reading unit that reads a rank of a card, and a camera unit 9 for imaging and recording substitute currency for gaming 3 put on each betting area 4 and the cards drawn from the card shooter apparatus 5 and distributed on the table. The camera unit 9 has a processing function for counting the substitute currency for gaming 3 of the players 2 on each of the betting areas 4 by using image-recognition technology, and identifying a total amount of wagers 3. Each total amount of the wagers 3 is calculated by analyzing pictures obtained from the camera unit 9 for the color and height of chips on each of the betting areas 4. A special camera unit 9 for this objective may be put in the surroundings of the table 1, and may take pictures from a side surface of the substitute currency for gaming of the wagers 3.

The present management system additionally includes a control unit 10 that determines, from a position of the substitute currency for gaming 3 that has been bet and information of distribution destinations of the cards understood on the basis of images imaged by the camera unit 9: 1) a number of people who are bettors, 2) whether or not each bettor gets more than two cards from the card shooter apparatus 5, 3) contents of each hand of the bettors and a dealer according to the information of the rank of the cards read by the card reading unit, and 4) winner(s) having the winning hand(s) according to a game rule based on the contents of each hand of the bettors and the dealer.

The camera unit 9 additionally has a function for imaging the table 1 each time a card is drawn from the card shooter apparatus 5. The control unit 10 has a function for comparing an image imaged by the camera unit 9 at a time of card drawing from the card shooter apparatus 5, and an image imaged by the camera unit 9 at a time of a following card drawing, and determining which of the players or the dealer the card drawn from the card shooter apparatus 5 immediately before has been delivered to. Moreover, the control unit 10 may have a configuration for comparing an image imaged by the camera unit 9 at a time of card drawing from the card shooter apparatus 5, and an image imaged by the camera unit 9 after a prescribed timing. As a result, it can be understood that the cards are distributed to the players and the dealer, by comparing two images imaged by the camera unit 9, and the contents of the hands of each player and the dealer and a win-loss result can be determined, by understanding information of a rank of the cards, at a time when the distributed cards are drawn, by the card shooter apparatus 5.

The control unit 10 additionally includes a function for determining two cards distributed as a hand to a player as a split, in the case where detecting that the two cards are separated a prescribed distance or more without overlapping, based on a comparison result of a plurality of images imaged by the camera unit 9, and recognizing that the two cards compose a plurality of hands with respect to one player. Moreover, the control unit 10 may include a function for determining two cards as a split in the case where detecting that additional substitute currency for gaming 3 has been put within a prescribed range of the substitute currency for gaming 3 for gaming bet by the player, and recognizing that the two cards compose a plurality of hands with respect to one player 2.

The control unit 10 is additionally capable of determining a type and number of the substitute currency for gaming 3 that has been bet for each hand, and in the case where determined to be a split, determines an amount of the substitute currency for gaming 3 that has been bet with respect to each hand for which a split has been performed.

The table 1 includes a bet area for insurance (not illustrated). The control unit 10 includes a function capable of determining that a first card 6 delivered to the dealer 11 is an A (ace), from information of the distribution destination of the cards 6 determined on the basis of an image imaged by the camera unit 9, and information of the rank of the cards 6 read by the card shooter apparatus 5, recognizing that insurance has been implemented in the case where detecting that chips have been additionally put in the bet area for insurance, and determining the players 2 who implemented insurance.

The camera unit 9 is capable of understanding an orientation of the card 6 drawn from the card shooter apparatus 5 and distributed on the table 1, and the control unit 10 includes a function for determining that a double down has been implemented in the case where an orientation of the card 6 distributed on the table 1 is a prescribed orientation, determined on the basis of an image imaged by the camera unit 9.

The control unit 10 additionally includes a function for determining that a surrender has been implemented in the case where recognizing that there is no hand of a player 2 during a game, in a state where a total value of the hand of the player 2 does not exceed 21 in accordance with a game rule, from information of the distribution destination of the cards 6 determined on the basis of an image imaged by the camera unit 9, and information of the rank of the cards 6 read by the card shooter apparatus 5.

The table 1 includes a bet area for a pair (not illustrated). The control unit 10 includes a function for recognizing two cards distributed to a player 2 as a pair in the case where determining that a rank of the two cards is identical, from information of the distribution destination of the cards 6 determined on the basis of an image imaged by the camera unit 9, and information of the rank of the cards 6 read by the card shooter apparatus 5.

The control unit 10 additionally has a configuration capable of determining a type, number, and position of substitute currency for gaming 3 that has been bet on the bet area for a pair. The determination of the type, number, and position of the substitute currency for gaming 3 identifies a total amount of wagers 3, by having the camera unit 9 count the substitute currency for gaming 3 on each of the betting areas 4.

The control unit 10 additionally includes a function for recognizing Black Jack in the case where determining that a total value of the two cards distributed to each of the players 2 or the dealer 11 is 21 in accordance with a game rule, determined from information of the distribution destination of the cards 6 determined on the basis of an image imaged by the camera unit 9, and information of the rank of the cards 6 read by the card shooter apparatus 5.

The control unit 10 additionally includes a function capable of generating a signal to notify an end of a game in the case where determining that the hand of the dealer is Black Jack.

The camera unit 9 or the control unit 10 has an intelligence type or deep learning structure capable of understanding a type and number of the substitute currency for gaming 3 put on the table 1, and a number or orientation of the cards 6 drawn from the card shooter apparatus 5 and distributed on the table 1.

The camera unit 9 has a configuration for additionally imaging the table 1 after a final card 6 distribution to the dealer 11 of the game based on a game rule. Moreover, the control unit 10 has a configuration capable of comparing an image imaged by the camera unit 9 at a time of a final card 6 drawing from the card shooter apparatus 5 to the dealer 11, and an image imaged by the camera unit 9 after a final card 6 distribution to the dealer 11, and understanding a distribution destination of a card 6 finally drawn in the game.

A prescribed button (not illustrated) attached to the card shooter apparatus 5 or the table 1 is additionally included, the camera unit 9 has a configuration for imaging the table 1 at a time when pressing down the button by the dealer 11 as necessary, and the control unit 10 has a configuration capable of comparing a plurality of images imaged by the camera unit 9 at a time of card 6 drawing from the card shooter apparatus 5 or at a time when the button has been pressed down. For example, imaging of the table 1 for triggering the drawing of a card from the card shooter apparatus is performed after the final card drawn from the card shooter apparatus in the game. Therefore, the destination of the final card cannot be understood as it is. However, the distribution destination of the final card can be understood, by having the dealer 11 press down the button after the distribution of the final card to perform imaging of the table.

The camera unit 9 may additionally have a configuration for constantly imaging a prescribed area of the table 1, and the control unit 10 may have a configuration capable of comparing a plurality of images imaged by the camera unit 9.

The table 1 includes a chip tray for managing the substitute currency for gaming 3, the control unit 10 understands a total amount of the substitute currency for gaming 3 in the chip tray, and the control unit 10 includes a function for adding or subtracting an increased or decreased amount of the substitute currency for gaming 3 in the game calculated from a position, type, and number of wagered substitute currency for gaming 3 of each player 2 in the game, and a win-loss result of each player, from a total amount of the substitute currency for gaming 3 in the chip tray before a settlement of each game, comparing a total amount there should be of the substitute currency for gaming 3 in the chip tray after a settlement at a time of completion of the game, and an actual total amount of the substitute currency for gaming 3 in the chip tray after a settlement at a time of completion of the game, and determining whether or not there is a difference between the total amount there should be and the actual total amount.

The control unit 10 additionally includes a function for understanding an actual total amount of the substitute currency for gaming 3 in the chip tray at a time when all collections of lost chips 3L wagered by each player 2 has ended, comparing a calculated total amount of the substitute currency for gaming 3 in the chip tray added with an increased amount of the chip tray in the game from a position, type, and number of the substitute currency for gaming 3 lost by losing players 2 to a total amount of the substitute currency for gaming 3 in the chip tray before a settlement of each game, and an actual total amount of the substitute currency for gaming 3 in the chip tray, and determining whether or not there is a difference between the total calculated amount after collection of the substitute currency for gaming 3 to be collected and the actual total amount.

The control unit 10 additionally includes a function for recognizing a bust in the case where determining that a total value of the hand of the player 2 or the dealer 11 exceeds 21 in accordance with a game rule, determined from information of the distribution destination of the cards 6 determined on the basis of an image imaged by the camera unit 9, and information of the rank of the cards 6 read by the card shooter apparatus 5, and the control unit 10 additionally includes a function for adding or subtracting an increased or decreased amount of the substitute currency for gaming 3 in the game calculated from a position, type, and number of the substitute currency for gaming 3 wagered by the player 2, from a total amount of the substitute currency for gaming 3 in the chip tray before a settlement at a time of a bust of each player 2, comparing a total amount there should be of the substitute currency for gaming 3 in the chip tray after a settlement and a time of a bust of a player 2, and an actual total amount of the substitute currency for gaming 3 in the chip tray after a settlement at a time of a bust of the player 2, and determining whether or not there is a difference between the total amount there should be and the actual total amount.

The control unit 10 may have a configuration for understanding a total amount of the substitute currency for gaming 3 in the chip tray, by using an RFID built into the substitute currency for gaming 3, instead of the camera unit 9, or in conjunction with the camera unit 9.

Embodiment 1 of the present invention will be described with reference to the attached drawings. Embodiment 1 of the present invention provides a card game monitoring system for playing Black Jack. In FIG. 1, the card game monitoring system has: a game table 1 on which bettors 2 make wagers by putting wagers 3 on betting areas 4; a card shooter apparatus that is put on the game table 1 and has a card reading unit that reads the number (rank) and suit of the cards 6 and having a control unit 7 to determine a winning hand according to a table game rule based on information of numbers (ranks) of the cards sequentially read by the card reading unit 5.

A monitor video camera system 8 which has several cameras 9 is set above each game table 1 to capture the positions of cards 6 delivered from the card shooter apparatus 5 to bettors 2. The monitor video camera system 8 identifies wagers 3 on each betting area 4 at the game table 1, the control unit 10 has a processing function using the information of the monitor video cameras 9 to determine the following: 1) head-count of the bettors playing on each game by identifying the positions of wagers on each betting area or cards delivered to each bettor 2 (three persons (heads) shown in FIG. 1), 2) number of cards delivered for each bettor 2 by dealer 11 from the card shooter apparatus 5 (whether or not each bettor 2 gets more than two cards).

The control unit 10 has further processing function using information from the monitor video cameras 9 to determine each hand of the bettors 2 and the dealer 11 according to the information read by the card shooter apparatus 5 using the information of the results of head-counting of the bettors 2 and according to the game rules installed in the control unit 7 of the card shooter apparatus 5. Then the control unit 7 will determine the winner W having the winning hand on the game based on the information of the hands of the bettors 2 and the dealer 11.

Wherein the card shooter apparatus 5 knows directions of each card (who gets each card read by the card shooter apparatus 5 through the monitor video camera system 8) and then the card shooter apparatus 5 (the control unit 7) will figure out by its programs the hands held by the bettors 2 and the dealer 11. The control unit 10 has further a processing function to check whether wagers 3 with payoffs 3W move to a pool 12 of the winner 2W of the bettors 2 determined by the card shooter apparatus 5 at the end of each game (the movement M for the winners and L for loser in FIG. 1).

The monitor video camera system 8 (with the control unit 10) has further processing function that identify ranks of playing cards 6 by analyzing pictures from the monitor video cameras 9 to determine each hand (number) of the bettors 2 on the game table delivered by a dealer 11 and checks whether suits and ranks of cards 6 are the same as the ones read and determined by the card shooter apparatus 5.

The monitor video camera system 8 (the control unit 10) has further processing function that identifies total amounts of wagers 3 by counting chips on each betting area 4 of the bettors 2. Each total amount of wagers 3 are calculated by analyzing pictures from the monitor video cameras 9 of its colors and its height of chips on each betting areas 4. Special video cameras 9*s* for this purpose may be put around the game table 1 to take side views of the chips of wagers 3.

Figure 2:
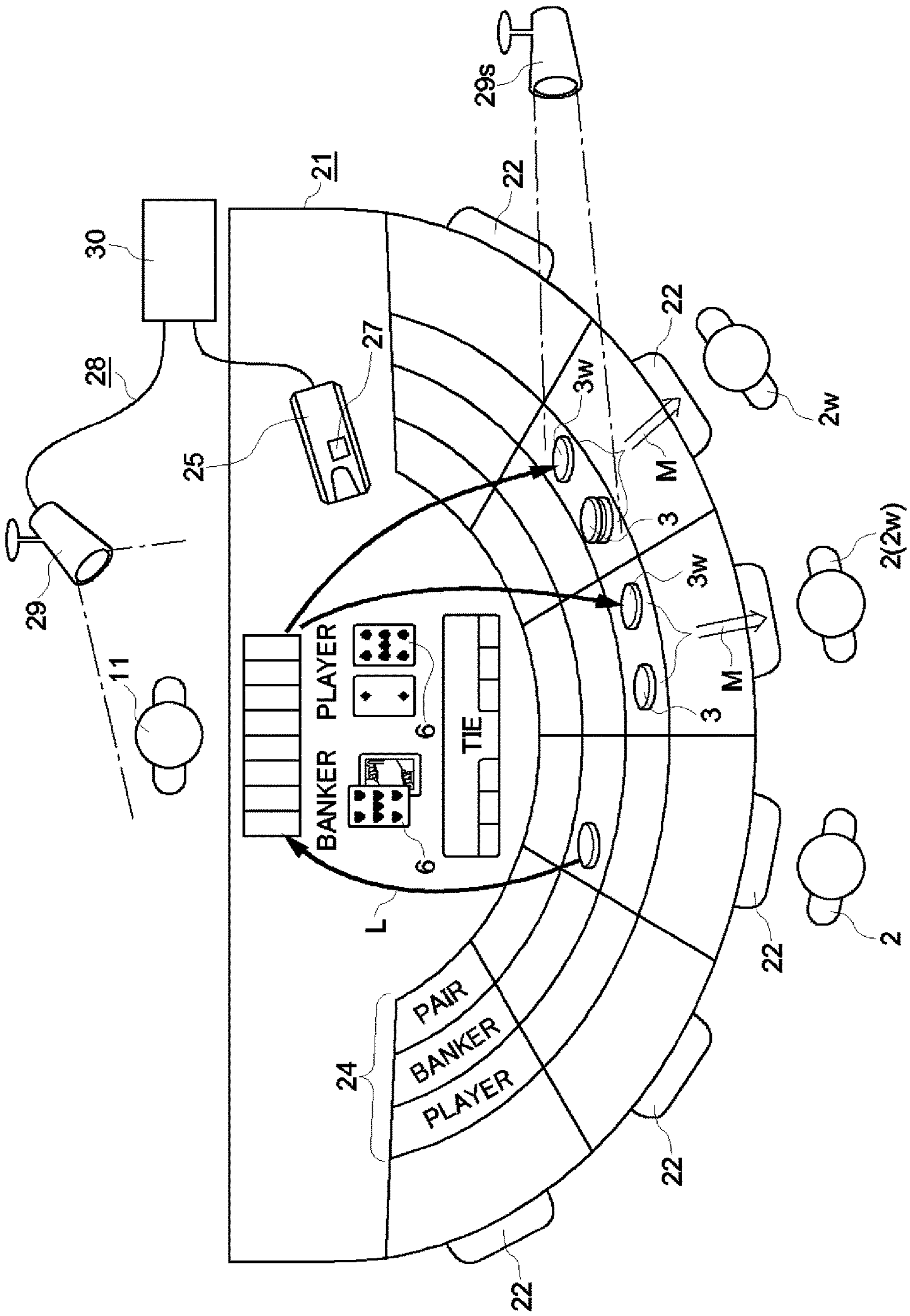
FIG. 2 is a diagram schematically showing the entirety of a table game system according to an embodiment 2 of the present invention.

FIG. 2 shows an example of Embodiment 2 of the present invention. Embodiment 2 of the present invention provides a card game monitoring system for playing game (Baccarat). In FIG. 2, the card game monitoring system has: a game table 21 on which bettors 2 make wagers by putting wagers 3 on betting areas 24; a card shooter apparatus 25 that is put on the game table 21 and has a card reading unit that reads the number (rank) and suit of the cards 6 and having a control unit 27 to determine a winning hand according to a table game rule based on information of numbers (ranks) of the cards 6 sequentially read by the card shooter apparatus 25.

A monitor video camera system 28 reads cards and movements of the wagers 3 on the game table. The control unit 27 of the card shooter apparatus 25 has processing functions to determine whether the winning hand is the Banker or the Player based on information of numbers (ranks) of the cards read by the a card shooter apparatus 25 and Baccarat game rule in the control unit 27. A control unit 30 of the card game monitoring system having processing function to check whether wagers 3 with payoffs 3W move to a pool 22 of the winners 2W of the bettors 2 after each game has ended.

Wherein the card shooter apparatus 25 knows that place (Banker or Player) to which each card is delivered according to the game rule of Baccarat and then the card shooter apparatus 25 (with the control unit 27) will calculate each hand of Banker and Player. In this way the card shooter apparatus 25 determines whether a winning hand is the Banker or the Player. The control unit 30 has a further processing function to check whether wagers 3 with payoffs 3W move to a pool 22 of the winner 2W of the bettors 2 determined by the card shooter apparatus 25 at the end of each game (the movement M for the winners and L for loser movement M in FIG. 2).

The monitor video camera system 28 (with the control unit 30) has further processing function that identify ranks of playing cards 6 on the game table 21 delivered by a dealer 11 by analyzing pictures obtained from the monitor video cameras 29. This card game monitoring system checks whether suits and ranks of cards 6 are the same as the ones read and determined by the card shooter apparatus 25 and reports to an administration section of the casino the results of whether the suits and ranks of cards 6 are the same as those delivered and read by the card shooter apparatus 25.

The monitor video camera system 28 (the control unit 30) has further processing function that identify total amounts of wagers 3 by counting chips on each betting area 24 of the bettors 2. Each total amount of wagers 3 is calculated by analyzing pictures from the monitor video cameras 29 of its colors and its height of chips on each betting areas 24. Special video cameras 29*s* for this purpose may be put around the game table 21 to take side views of the chips of wagers 3.

In both examples of Embodiment 1 and 2 the monitor video camera system 8 and 28 can identify positions of wagers 3, the total amount of wagers 3 of its colors and its height of chips on each betting areas 4 and 24 by analyzing pictures taken by the video cameras 9, 9*s*, 29 and 29*s* using CCD and through known technology of vision analysis. The monitor video camera system 8 and 28 can also identify positions of cards 3 and analyze the faces of cards showing in betting.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The card game monitoring system mentioned above, the card shooter apparatus has further determination function of the card games when each game starts and ends according to the rules of Baccarat or Black Jack with monitoring video camera system.

The card game monitoring system mentioned above, the control unit has further processing function to check whether wagers do not move from the original betting position to the other area during the each game starts and ends (during each game).

The card game monitoring system mentioned above, the control unit has a determination function to determine when the betting starts before the start of each game (the betting start indicates the time the first bet is put on the betting area).

The card game monitoring system mentioned above, the control unit has a determination function to determine when the betting ends before the start of each game (the betting end indicates the time the first card is delivered from the card shooter apparatus). Also the control unit has a processing function using the information from the monitor video camera system to determine the movement of the dealer's hand representing the end of betting called "No more bet."

The card game monitoring system mentioned above, the control unit has a determination function to determine when the payoff has completed after the end of each game.

The card game monitoring system mentioned above, the control unit has a transmitting function to transmit the information of the monitor video camera to a backyard in casino.

The card game monitoring system mentioned above, the control unit has a determination function to determine an error, and the card game monitoring system further has an output means to output an error signal by displaying and/or alarming in the card shooter apparatus and/or the related system components incorporated in the card game monitoring system as a result of the determination of the error. The error mentioned above includes at least one of the following items: 1) The ranks of playing cards identified by the card game monitoring system on the game table delivered by the dealer are not same as the ones determined by the card shooter apparatus; 2) Wagers have moved from the original betting position to other areas during each game; 3) Wagers with payoffs have not moved to the winners of the bettors at the end of each game.

The card game monitoring system mentioned above, the control unit has a determination function to identify a cut card delivered from the card shooter apparatus.

The invention claimed is:

1. A management system of a table game for Black Jack on a table, the table includes one or more betting areas configured to receive wagers of substitute currency for gaming from one or more game participants, the management system comprising:

a card shooter used on the table and configured to allow cards to be drawn one by one and to obtain rank information for each drawn card;

a camera unit including a camera configured to, in response to drawing of a card from the card shooter, capture an image of one or more cards drawn from the card shooter and distributed on the table; and a control unit configured to:

for each of the one or more cards, based on the captured image, determine distribution destination information and the rank information; and based on the distribution destination information and the rank information of the one or more cards, determine:

1) for each of the one or more game participants, whether the game participant received more than two cards from the card shooter;

2) contents of each hand of the one or more game participants and a dealer according to the ranks of the cards; and 3) based on the contents of each of the hands of the game participants and of the dealer, at least one game participant of the one or more game participants having a winning hand according to a game rule.

2. The management system according to claim 1, wherein the control unit is configured to:

compare the image captured by the camera unit at a first time before the card is drawn from the card shooter, and an image captured by the camera unit after the card is drawn; and determine to which of the one or more game participants or the dealer that the card drawn from the card shooter is delivered based on a result of the comparison.

3. The management system according to claim 2, wherein the control unit is configured to:

based on a comparison result of a plurality of images captured by the camera unit, determine two cards distributed as a hand to one of the one or more game participants as a split in:

a first case where the two cards are detected as being separated greater than or equal to a threshold distance without overlapping, or in a second case where additional substitute currency for gaming is detected as having been placed less than or equal to a threshold range of the substitute currency for gaming that has been wagered by the one of the one or more game participants; and recognize that the two cards correspond to a plurality of hands associated with the one of the one or more game participants.

4. The management system according to claim 3, wherein the control unit is configured to:

determine a type and number of the substitute currency for gaming wagered for each hand; and based on a determination of the split, determine an amount of the substitute currency for gaming wagered for each hand for which the split has been performed.

5. The management system according to claim 1, wherein the one or more bet areas of the table include a bet area for insurance, and the control unit is further configured to:

determine that a first of the cards delivered to the dealer is an A from the determined distribution destination information of the of the cards and information of the rank of the cards read by a card reader of the card shooter;

identify that insurance has been implemented based on substitute currency placed in the bet area for insurance; and determine a game participant of the one or more game participants associated with the implemented insurance.

6. The management system according to claim 1, wherein:

the card shooter includes a card reader configured to read ranks of cards drawn from the card shooter;

the camera unit is configured to determine respective orientations of the cards drawn from the card shooter and distributed on the table; and the control unit is configured to:

determine the contents of each hand of the one or more game participants and the dealer according to the ranks of the cards read by the card reader; and determine that a double down is implemented based on a respective orientation, determined by the camera unit, of one of the cards distributed on the table is a prescribed orientation.

7. The management system according to claim 1, wherein the control unit is further configured to determine, after a total value of a prior hand of a game participant does not exceed 21 in accordance with a game rule, that a surrender occurred based on a recognition that there is no hand of the game participant during a game and based on the distribution destination information of the cards determined from an image captured by the camera unit and the rank information of the cards read by a card reader of the card shooter.

8. The management system according to claim 1, wherein:

the one or more bet areas of the table include a bet area for a pair; and the control unit is further configured to detect, based on of the distribution destination information of the cards from an image captured by the camera unit and the rank information of the cards read by a card reader of the card shooter, two of the cards distributed to one of the one or more game participants as a pair based on a determination that a rank of the two cards is identical.

9. The management system according to claim 8, wherein the control unit is further configured to determine a type, number, and position of substitute currency for gaming bet on the bet area for the pair.

10. The management system according to claim 1, wherein the control unit is further configured to detect, based on the distribution destination information and the rank information of the one or more cards, Black Jack when a total value of cards distributed to a game participant of the one or more game participants or the dealer is 21 in accordance with a game rule.

11. The management system according to claim 10, wherein the control unit is further configured to generate a signal associated with a notification of an end of a game based on a determination that the hand of the dealer is Black Jack.

12. The management system according to claim 1, wherein the camera unit or the control unit includes an intelligence type or deep learning structure configured to identify a type and number of the substitute currency for gaming put on the table, or a number or orientation of the cards drawn from the card shooter and distributed on the table.

13. The management system according to claim 1, wherein the camera unit is further configured to:

capture one or more images of the table in association with a final card distribution to the dealer of the game based on a game rule;

compare a first image captured by the camera unit at a time of the final card drawing from the card shooter to the dealer, and a second image captured by the camera unit after the final card distribution to the dealer; and determine a distribution destination of the drawn final card of the cards in the game.

14. The management system according to claim 1, wherein:

the camera unit is further configured to capture a plurality of images of a particular area of the table; and the control unit is further configured to compare the plurality of images captured by the camera unit.

15. The management system according to claim 1, wherein:

the camera unit is further configured to capture an image of the substitute currency for gaming placed on the one or more betting areas, and the control unit is further configured to determine a position of the substitute currency for gaming that has been wagered based on the captured image.

16. The management system according to claim 15, wherein:

the table comprises a chip tray for managing the substitute currency for gaming; and the control unit is further configured to:

determine an actual total amount of the substitute currency for gaming that is in the chip tray at a time when all collections of lost chips wagered by the one or more game participants has ended; and compare:

(a) a calculated total amount of the substitute currency for gaming that is in the chip tray by addition of an increased amount, which is determined from a position, type, and number of the substitute currency for gaming lost by losing ones of the one or more game participants, to a total amount of the substitute currency for gaming that was in the chip tray before a settlement of the game; and (b) an actual total amount of the substitute currency for gaming in the chip tray; and determine, based on the comparison, whether there is a difference between the calculated total amount and the actual total amount.

17. The management system according to claim 15, wherein:

the table comprises a chip tray for managing the substitute currency for gaming; and the control unit is configured to:

detect a bust based on a determination that a total value of the hand of one of the one or more game participants or the dealer is greater than 21 in accordance with a game rule and based on (a) the distribution destination information of the cards determined from an image captured by the camera unit, and (b) the rank information of the cards read by a card reader of the card shooter;

determine a changed amount of the substitute currency for gaming that is to be present in the chip tray at a time of the bust by a total amount of the substitute currency for gaming that is in the chip tray before a settlement of the game being modified by addition or subtraction of a change amount of the substitute currency for gaming, the modification being calculated from a position, type, and number of wagered substitute currency for gaming of the one or more game participants; and compare the determined changed amount to an actual total amount of the substitute currency for gaming that is in the chip tray after the bust; and determine, based on the comparison whether there is a difference between the determined changed amount and the actual total amount.

18. The management system according to claim 15, wherein:

the table comprises a chip tray for managing the substitute currency for gaming; and the control unit is configured to determine a total amount of the substitute currency for gaming in the chip tray;

determine a changed amount of the substitute currency for gaming that is to be present in the chip tray after completion of the game by a total amount of the substitute currency for gaming that is in the chip tray before a settlement of the game being modified by addition or subtraction of the change amount of the substitute currency for gaming, the modification being calculated from a position, type, and number of wagered substitute currency for gaming of each of the one or more game participants of the game and a win-loss result of each of the one or more game participants;

compare the determined changed amount and an actual total amount of the substitute currency for gaming that is in the chip tray after the settlement at a time of the completion of the game; and determine, based on the comparison, whether there is a difference between the determined changed amount and the actual total amount.

19. The management system according to claim 18, wherein the control unit is configured to determine the actual total amount of the substitute currency for gaming in the chip tray based on the camera unit or a radio-frequency identification (RFID).

20. The management system according to claim 1, wherein, for each of the one or more game participants, the control unit is configured to determine, based on the determined distribution destination information, whether the game participant has received, from the card shooter, the more than the two cards as an initial card distribution for the game.

21. The management system according to claim 1, wherein the card shooter is distinct from the camera unit.

* * * * *